J. H. H. BENNETT.
Wagon-Brake.
No. 29,232. Patented July 24, 1860.
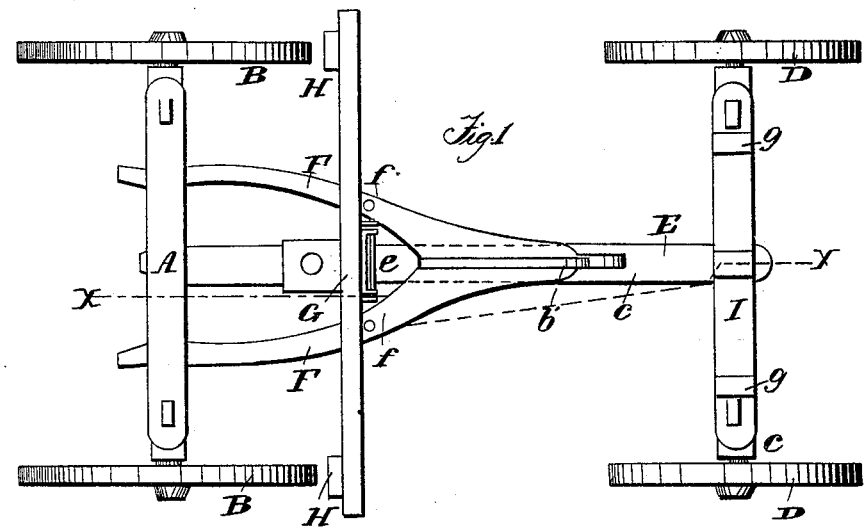
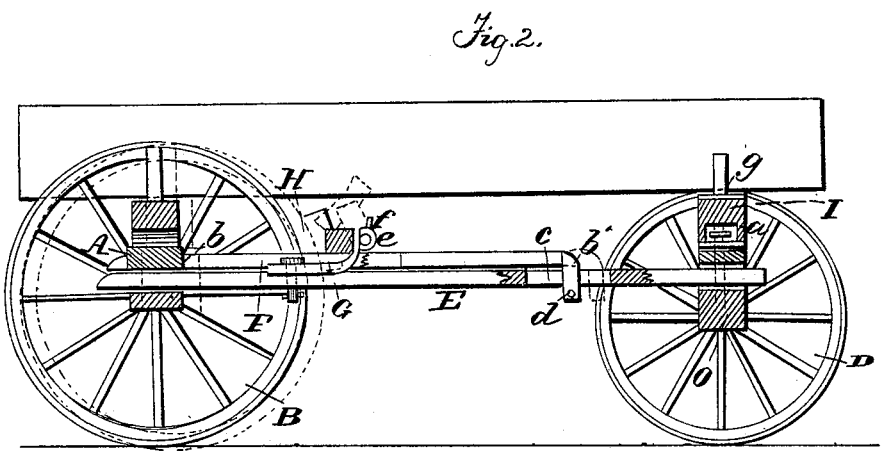

UNITED STATES PATENT OFFICE.

J. H. H. BENNETT, OF HUNTS HOLLOW, NEW YORK.

WAGON-BRAKE.

Specification of Letters Patent No. 29,232, dated July 24, 1860.

*To all whom it may concern:*

Be it known that I, J. H. H. BENNETT, of Hunts Hollow, in the county of Livingston and State of New York, have invented a new and Improved Wagon-Brake; and I do hereby declare that the following is a full, clear, and exact description of the same, reference being had to the accompanying drawing, forming a part of this specification, in which—

Figure 1 represents a plan or top view of my invention. Fig. 2 is a longitudinal vertical section of the same, the line $x$, $x$, Fig. 1, indicating the plane of section.

Similar letters of reference in both views indicate corresponding parts.

This invention consists in uniting the brake head and the reach by means of a hinge so that in backing the brakes are turned up and the motion of the hind wheels is not interfered with.

To enable those skilled in the art to make and use my invention, I will proceed to describe its construction and operation with reference to the drawing.

The axle A, of the hind wheels B, and the axle C, of the fore wheels D, are united by the reach E, which is secured to the forward axle by means of the king bolt $a$, in the usual manner, but its rear end passes freely through a mortise $b$, in the axle of the hind wheels allowing the latter to slide on the reach in a longitudinal direction to and from the fore wheels D.

In order to guide the hind wheels in this motion and to keep them in the proper direction, hounds F, are rigidly fastened to the axle A, and these hounds extend forward to about two thirds of the length of the reach, where they unite being fastened to the hooked guide plate $b'$ that passes through a slot $c$, in the reach, being fastened on its under side by a pin $d$, or in any other convenient manner.

The brake head G, is secured to the reach E, by means of a hinge $e$, and the motion of the reach together with the shoe in a direction from the hind axle is limited, by two stops $f$, that are inserted in the upper surfaces of the hounds F, allowing the reach sufficient motion to bring the brake shoes H, clear off the surfaces of the hind wheels.

The body of the wagon or the load, which is represented in red outlines in Fig. 2, is supposed to be rigidly attached to the axle A, of the hind wheels, and it slides easily on the forward bolster I, which is provided with smooth polished plates $g$, to lessen the friction or instead of these plates friction rollers may be used or the forward bolster itself may be constructed in such a manner that it together with the load rolls or slides along in a longitudinal direction.

If the wagon moves on descending ground or down hill, the gravity causes the load or the body of the wagon to slide forward and the hind wheels are forced up against the brake shoes with a force which is in proportion to the descending grade, and to the weight of the load. As the wagon passes on level ground or uphill the strain exerted on the forward axle is sufficient, to produce a sliding motion of the reach in a direction from the hind axle and the brakes are taken off. If the draft animals back up, the retrograde motion of the hind wheels causes the brake head to turn upon the hinge $e$, to a position shown in blue outlines in Fig. 2, and the wheels move freely without being interfered with by the brake.

This brake is so arranged, that it does not interfere in any way with the motion of the wagon, the forward truck can be turned in every direction just as easy as a common truck, and the action of the brake is entirely automatic. The force with which the brakes are applied depends entirely upon the grade, upon which the wagon moves and upon the weight of the load, the brake does not interfere in any way with the retrograde motion of the wagon and all the parts are so constructed that they cannot easily get out of order. It is a simple, cheap and effective brake which recommends itself and which can be adjusted to every four wheeled vehicle with little trouble.

Having thus fully described my invention, what I claim as new and desire to secure by Letters Patent, is—

The arrangement of the hinge $e$, in combination with the reach E, and brake head G, constructed and operating substantially as and for the purpose set forth.

J. H. H. BENNETT.

Witnesses:
E. S. BENNETT,
M. E. BENNETT.